United States Patent [19]

Deligny

[11] Patent Number: 4,549,709
[45] Date of Patent: * Oct. 29, 1985

[54] DEVICE FOR ATTACHING TO A WALL THE END OF A SHEATH IN WHICH A CONTROL CABLE IS SLIDABLY RECEIVED

[75] Inventor: Jean Deligny, Le Mans, France

[73] Assignee: Societe Anonyme DBA, Paris, France

[ * ] Notice: The portion of the term of this patent subsequent to Dec. 20, 2000 has been disclaimed.

[21] Appl. No.: 349,889

[22] Filed: Feb. 18, 1982

[30] Foreign Application Priority Data

Feb. 27, 1981 [FR] France ............... 81 03947

[51] Int. Cl.⁴ ............................................. F16L 5/00
[52] U.S. Cl. ............................ 248/56; 74/501.5 R; 174/65 R
[58] Field of Search ............... 248/56, 57, 55; 24/115 L, 136 A, 136 R; 308/6 R; 74/501.5; 403/369, 368, 192, 194, 197; 174/65 R

[56] References Cited

U.S. PATENT DOCUMENTS

| 2,417,581 | 3/1947 | Aldred | 74/501.5 |
| 2,597,270 | 5/1952 | White | 74/501.5 |
| 2,730,134 | 1/1956 | Morse | 138/57 |
| 2,957,354 | 10/1960 | Morrow | 74/502 |
| 3,744,008 | 7/1973 | Castellani | 248/56 |
| 4,103,514 | 8/1978 | Grosse-Entrup | 308/6 R |
| 4,141,117 | 2/1979 | Van Gompel | 24/136 R |
| 4,297,913 | 11/1981 | Garbo | 74/501 R |
| 4,420,988 | 12/1983 | Deligny | 74/501.5 |

FOREIGN PATENT DOCUMENTS

| 80401701.0 | 6/1981 | European Pat. Off. . |
| 2910421 | 9/1979 | Fed. Rep. of Germany . |
| 2278982 | 2/1972 | France . |
| 2111125 | 6/1972 | France . |
| 2375489 | 7/1978 | France . |
| 2470994 | 6/1981 | France . |

Primary Examiner—William H. Schultz
Assistant Examiner—Ramon O. Ramirez
Attorney, Agent, or Firm—Larry J. Palguta; Ken C. Decker

[57] ABSTRACT

A device (210) for attaching to a wall (212) the end (214) of a sheath (216), in which a control cable (218) is slidably received, comprising a sheath end fitting (211) associated with said end and designed to be received in an aperture (220) provided in said wall, said sheath end being slidably received in an inner bore (226) of the end fitting, the latter being provided with locking means (230) for fixing the end of the sheath axially with respect to the end fitting after installation of the control cable, characterized in that it comprises an adjustment spring (56) bearing on said end fitting and urging said sheath end resiliently away from said wall when the cable is installed.

19 Claims, 5 Drawing Figures

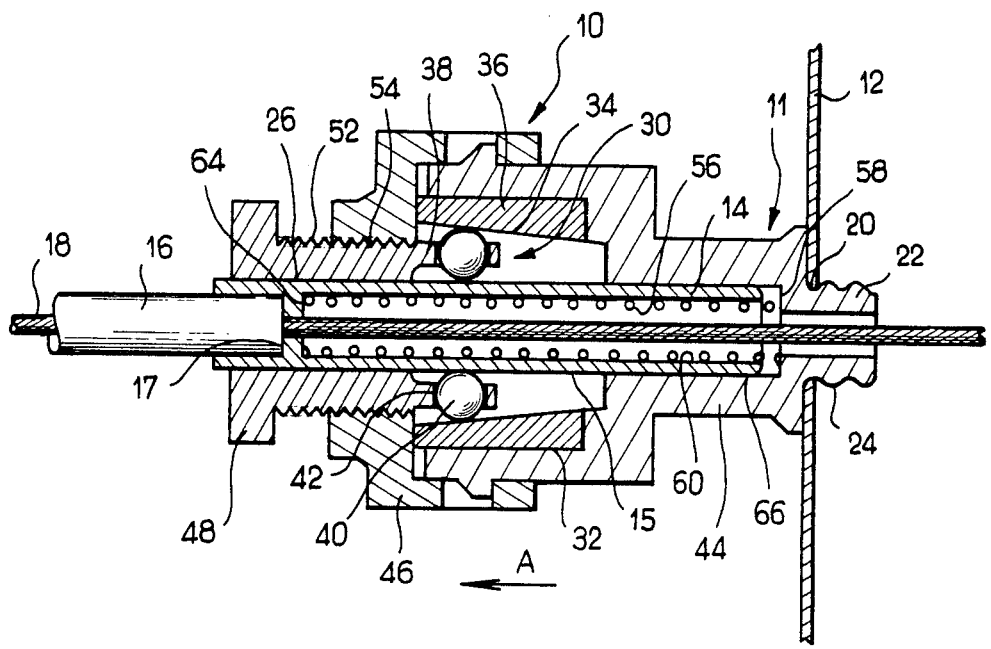
FIG_1
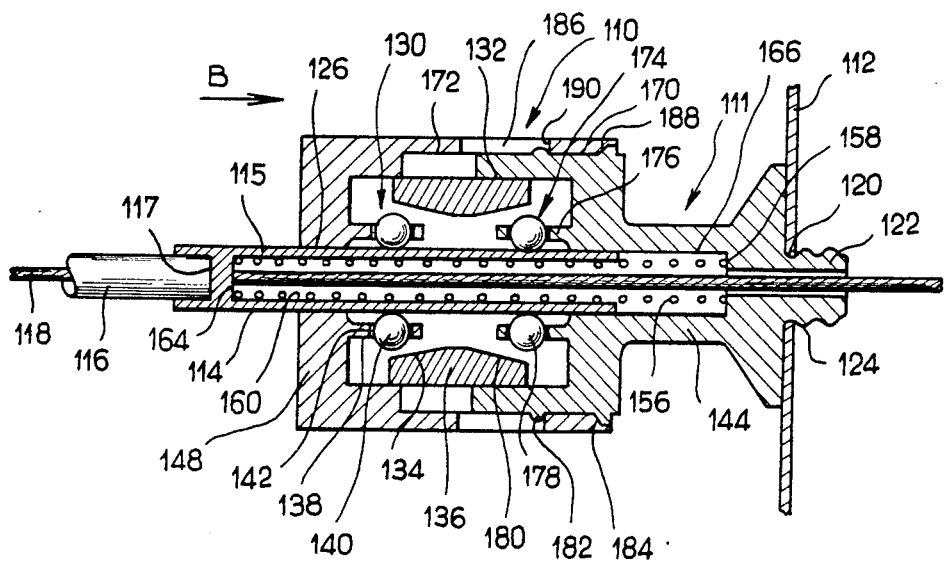
FIG_2

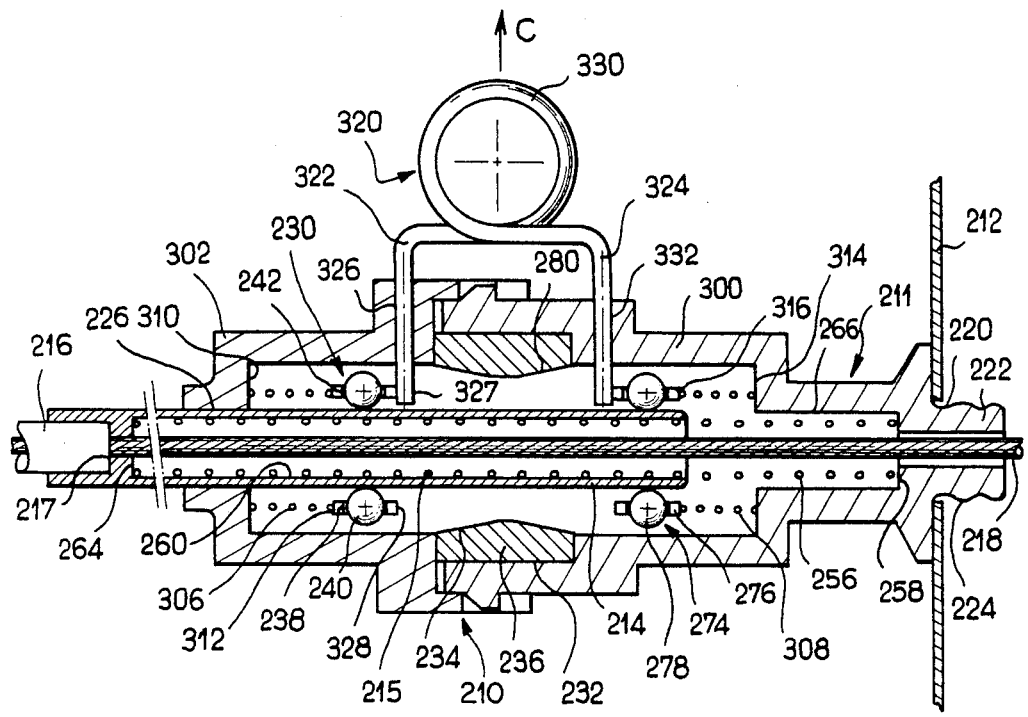
FIG_3
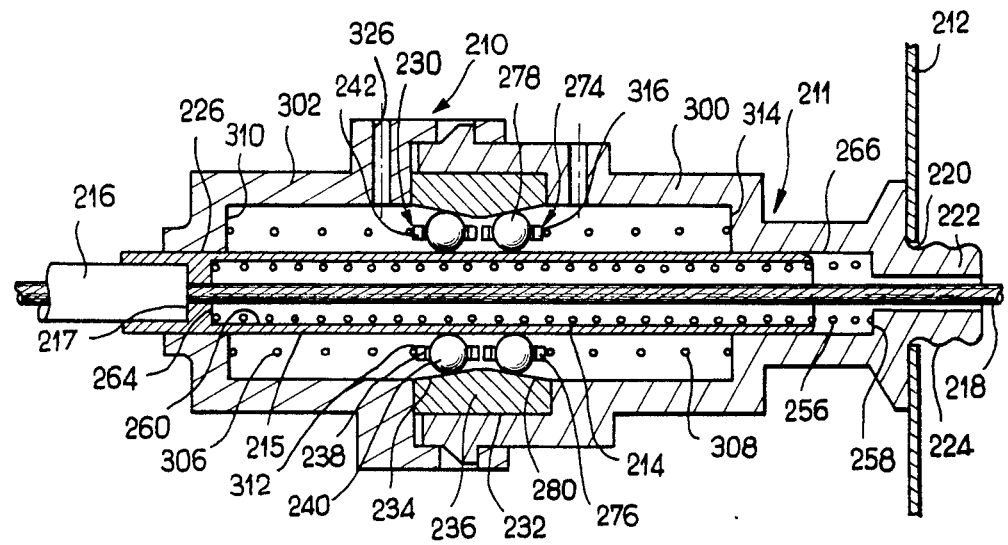
FIG_4

DEVICE FOR ATTACHING TO A WALL THE END OF A SHEATH IN WHICH A CONTROL CABLE IS SLIDABLY RECEIVED

The object of the present invention is a device for attaching to a wall the end of a sheath in which a control cable is slidably received, comprising a sheath end fitting associated with said end and designed to be received in an aperture provided in the wall.

The invention more particularly concerns a sheath end fitting adaptable to one of the ends of the ends of a control cable usually provided with two sheath end fittings. Such cables are generally used on motor vehicles to control the brakes or a friction clutch. This type of cable is also used to control gearboxes and in the latter instance the cables used are of the "push-pull" type. These cables are generally installed between two fixed walls of a vehicle and the two sheath ends are designed to be respectively received in an aperture provided in one of the two walls. When vehicle manufacturing tolerances become too large, installing the cable on the vehicle, i.e., inserting the two sheaths end fittings in their respective aperture, sometimes becomes difficult and even impossible, as the length of sheath initially provided can be too short or too long, thus preventing installation on the vehicle.

With the aim of remedying this problem, the invention proposes a device for attaching to a wall the end of a sheath, in which a control cable is slidably received, comprising a sheath end fitting associated with said end and designed to be received in an aperture provided in said wall, said sheath end being slidably received in an inner bore of said end fitting, the latter being provided with locking means for fixing the end of the sheath axially with respect to said end fitting after installation of the control cable, characterized in that it comprises an adjustment spring bearing on said end fitting and urging said sheath end resiliently away from said wall when the cable is installed.

According to one characteristic of the invention, the locking means are constituted by a wedging system disposed between the inner wall of said terminal, and the inner surface of said sheath end. In the particular embodiments of the invention which will be described hereinafter, the wedging system is of the type comprising wedging balls received between one frustoconical bearing surface and the outer surface of the sheath end.

The four embodiments will now be described, with reference to the attached drawings in which:

FIG. 1 is a view in axial section of a first embodiment of the attachment device according to the invention;

FIG. 2 is a view in axial section of a second embodiment of the attachment device according to the invention;

FIG. 3 is a view in axial section of a third embodiment of an attachment device according to the invention; and FIG. 4 is a view of the attachment device represented in FIG. 3 after installation of the control cable and after adjustment of the length of the sheath has been carried out.

Figure 5:
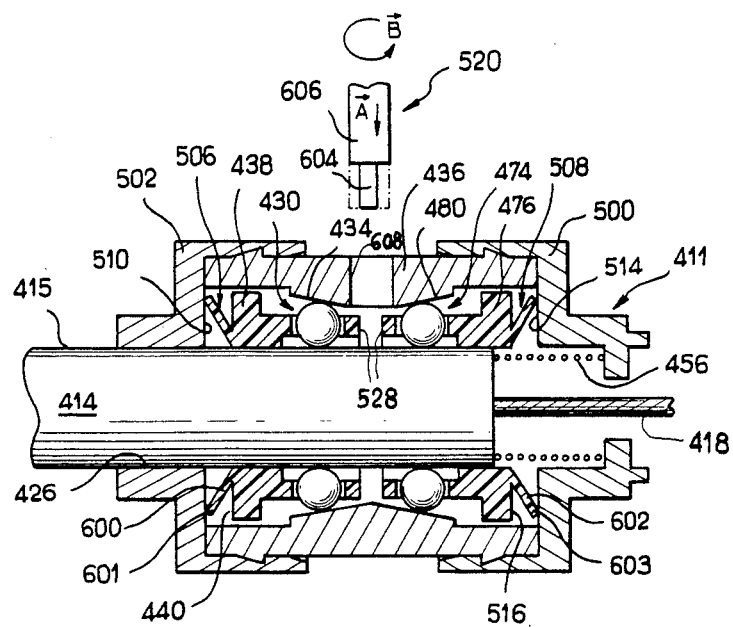
FIG. 5 is a view in axial section of a fourth embodiment of the attachment device of the invention.

FIG. 1 shows a device designated by the general reference 10, for attaching to a fixed wall 12 the end 14 of a control cable 16 in which a control cable 18 is received slidably. The attachment device 10 comprises an end fitting 11 received in an aperture 20 of the wall into which it is fitted forcibly by its axial end 22 which is provided with ridges 24 ensuring the attachment of the device 10 to the wall 12. The cable represented in FIG. 1, comprised of the sheath 16 and the actual cable 18 is generally of the type used for controlling friction clutches, i.e. of the type used only to exert a traction force on the cable. The sheath end 14 is constituted by a rigid metal tubular piece fixed to the end 17 of the sheath 16. The sheath end 14 is received in a sliding fashion in an inner bore 26 formed in the attachment device. According to the invention, the attachment device 10 is provided with a locking means 30 allowing the end 14 of the sheath to be fixed axially with respect to the end fitting 11. The locking apparatus 30 is constituted by a system of wedging with balls disposed between the inner wall 32 of the end fitting 11 and the outer peripheral surface 15 of the sheath end 14. The system of wedging with balls includes a frusto-conical bearing surface 34 formed on the inner wall 32 of the end fitting 11. In the illustrated embodiment, the frusto-conical bearing surface 34 is formed on a separate ring 36 fitted in the inner bore constituting said inner wall 32 of the end fitting 11. The system of wedging with balls also includes a ball cage 38 of a generally tubular shape disposed between said frusto-conical bearing surface 34 and the outer peripheral surface 15 of the sheath end 14, coaxially of the latter surface. The cage 38 is provided with balls 40 distributed circumferentially and disposed in radial bores 42 in the cage in which they are mounted to rotate. In the embodiment represented in FIG. 1, the sheath end fitting 11 includes a first part 44 whose end 22 is received in the aperture 20, and a second removable part 48. The first end fitting part 44 is constituted by two elements 44 and 46, one fitted inside the other on assembly of said end fitting and thus made solid with one another. The end fitting includes a second removable part 48 on which the ball cage 38 is fixed. In the illustrated embodiment, the ball cage 38 and the second end fitting part 48 form only a single piece screwthreadedly mounted by means of the screw thread 52 formed at the periphery of the second part 48 in a threaded inner bore 54 in the second element 46 of the first end fitting part. It will be understood that such a mounting makes the second removable part 48 capable of axial displacement, drawing the ball cage 38 with it, with respect to the first end fitting part in which the frustoconical bearing surface 34 is formed. Lastly, the attachment device 10 includes an adjustment spring 56. The adjustment spring 56 is a helical compression spring mounted in an inner bore 60 of the sheath end 14 and which bears on the one hand on a bearing surface 58 formed in the end fitting 11 and on the other hand on the bottom 64 of the inner bore 60 of the sheath end 14. The adjustment spring 56 thus mounted resiliently urges the sheath end 14 and hence the sheath 16 away from the wall 12, i.e. in the direction indicated by the arrow A of FIG. 1.

The attachment device 10 is represented in FIG. 1 after installation of the control cable on the vehicle, i.e. when the locking means constituted by the wedging system 30 has fixed the sheath end 14 with respect to the end fitting 11 and hence with respect to the wall 12. Installation of the apparatus and the cable on the vehicle is carried out in the following way: after having unscrewed in the direction of arrow A the second terminal part 48 with respect to the element 46 of the first end fitting part until the sheath end 14 is free to slide with respect to the end fitting 11, i.e. in an axial position in which the balls 40 are no longer in contact with the frusto-conical bearing surface 34 and the outer peripheral surface 15 of the sheath end 14, the operator fits the end 22 of the end fitting 11 into the aperture in the wall 20. The operator can then fit a sheath end fitting of a conventional type provided at the other end of the sheath 16 (not represented) in an aperture in another wall of the vehicle. When the cable is installed, the sheath end 14 is free to slide axially in the inner bore 26 formed in the second part 48 of the end fitting 11 and in the coaxial inner bore 66 formed in the first end fitting part 44. This sliding facilitates installation of the cable since a sheath of variable length is obtained, allowing adaptation to any variation in tolerance separating the two walls of the vehicle in which the ends of the sheath are mounted. This adaptation of sheath length is made easier by the adjustment spring 56 which draws the sheath 16 away from the wall 12 and hence in the direction of the second wall (not represented). When installation is finished, the operative fitting the cable has only to displace the second end fitting part 48 axially with respect to the first end fitting part 46 by screwing the second part 48 into the inner bore 54 of the second element 46 of the first end fitting part 44. The operator carries out this screwing until the position represented in FIG. 1 is again reached, in which the balls are wedged between the frusto-conical surface 34 and the outer peripheral surface 15 of the sheath end 14. In this position, the attachment apparatus 10 behaves like a rigid, one-piece end fitting 10 allowing the sheath 16 to be fixed to the wall 12.

FIG. 2 illustrates a second embodiment of a device for attaching a sheath to a wall. In the embodiment illustrating FIG. 2, the cable used is of the push-pull type used for controlling gearboxes. The components of the device of FIG. 2 identical or equivalent to components already illustrated in FIG. 1 are designated by the same reference numerals increased by 100. The device 110 illustrated in FIG. 2 comprises an end fitting 111 constituted by a first end fitting part 144 and a second end fitting part 148. The first end fitting part 144 is received telescopically in the second end fitting part 148 by means of the outer wall 170 which slides in the inner bore 172 of the second end fitting part 148. As the attachment apparatus represented is intended to allow installation of a cable of the push-pull type, it is provided with a second wedging system 174, identical to the wedging system 130 but disposed in a symmetrical fashion with respect to a median plane of the apparatus 110. The apparatus 174 in fact comprises a ball cage 176 provided with balls 178 capable of cooperating with a frusto-conical bearing surface 180 formed on the separate tubular piece on which the frusto-conical bearing surface 134 is formed and with the outer peripheral wall 115 of the sheath end 114. The axial position of the second end fitting part 148 fitted telescopically on the first terminal part 144 is determined by relative axial fixing means constituted by two ridges 182 and 184 formed on the outer peripheral surface 170 of the first terminal part 144, and which are capable of cooperating with an outer peripheral slot 186 formed in the second end fitting part 148. Cooperation of the ridges 182 and 184 with the outer slot 186 constitutes a ratchet mechanism for the first end fitting part 144 in the second end fitting part 148 allowing the relative position of these two elements to be axially varied and fixed. The various components of the attachment device 110 are represented in FIG. 2 in the position they occupy when the cable is installed on the vehicle, i.e. before axial fixing of the sheath end with respect to the end fitting 111. In this position and as can be noted from FIG. 2, the systems 130 and 174 of wedging with balls are free, i.e. the balls 140 and 182 are not wedged between their respective frusto-conical bearing surfaces 134 and 180 and the outer peripheral surface 115 of the sheath end 114. In this position, the operator can install the control cable on the vehicle in the same way as the one described for the first embodiment illustrated in FIG. 1. When the operator has installed the cable and adjustment of the length of the sheath has been made automatically under the action of the adjustment spring 156, the operator should then lock the systems 130 and 174 of wedging with balls. To do this, the operator urges the second end fitting part 148 axially in the direction indicated by the arrow $\vec{B}$ of FIG. 2, against the stop defined by the cooperation between the ridge 184 and the surface 188 formed at the side end of the second part 148, until the ridge 184 instead of the ridge 182 cooperates with the side end surface 190 of the outer peripheral slot 186. It will be understood that when the two elements occupy this new position, bringing together the two ball cages 138 and 176 causes wedging of the balls 140 and 178 between their respective frusto-conical bearing surface and the outer peripheral surface of the sheath end. To ensure proper locking of the two systems 138 and 174 of wedging with balls, it is of course necessary for the displacement travel between the two ridges 182 and 184 to be greater than or equal to the distance separating the theoretical points of contact of the balls 140 and 178 with their respective frusto-conical bearing surfaces: the separate tubular piece 136 must also by fitted slidingly in the inner bore 132 of the first end fitting part 144.

FIGS. 3 and 4 illustrate a third embodiment of an apparatus for attaching one end of a control cable sheath to a wall. In this third embodiment, the cable used is the push-pull type like the one represented in FIG. 2. The components of the attachment device illustrated in FIGS. 3 and 4, identical or equivalent to the components of the device 110 of FIG. 2, are designated by the same reference numerals increased by 100. In this third embodiment, the two ball cages 238 and 276 of the two systems 230 and 274 of wedging with balls, are mounted to be free axially with respect to the body of the end fitting 211 which in this embodiment comprises two elements 300 and 302 forming a casing. According to one characteristic of the invention, the ball cages 238 and 276 are each provided with a wedging spring 306 and 308, respectively. The wedging spring 306 is a helical compression spring bearing on a bearing surface 310 formed in the element 302 of the end fitting 211 and on a surface 312 formed on the ball cage 238. The wedging spring 306 thus disposed urges the ball cage 238 resiliently in the direction of the conical bearing surface 234, i.e. in the axial direction corresponding to wedging of the balls 240 between the frusto-conical bearing surface 234 and the outer peripheral wall 215 of the sheath end 214. In a symmetrical manner, the wedging spring 308 is a helical compression spring bearing on the surface 314 formed in the first element 300 of the casing of the end fitting 211, and the bearing surface 316 forming on the end of the ball cage 276. According to another characteristic of the invention, and as can be noted from FIG. 3, the attachment apparatus includes removable abutment means 320, fixing the ball cages 238 and 276 against resilient forces exerted by the wedging springs 306 and 308, in a position, illustrated in FIG. 3, in which the balls 240 and 278 are not wedged between the frusto-conical bearing surfaces 234 and 280 and the outer peripheral surface 215 of the sheath end 214, the latter being free to slide with respect to the end fitting 211 so that the cable can be installed on the vehicle. In the illustrated embodiment, the removable abutment means 320 are constituted by a single element which combines two removable abutment means 322 and 324 which each cooperate with the ball cages 238 and 276 respectively. The abutment means 322 will be described, by way of example. The removable stop means 322 is constituted by a pin, fitted to slide in a radial bore 326 formed in the end fitting 211 and whose end 327 cooperates with an abutment surface 328 formed at the end of the cage 238. The removable abutment means 322 and 324 are connected by a loop 330 produced integrally with them which facilitates removal of the removable abutment means after the cables are installed on the vehicle.

When an operator has installed the cable on the vehicle, in exactly the same way as described for the embodiments of the apparatus represented in FIG. 1 and 2, he pulls on the loop 330 of the removable abutment means 320 in the direction indicated by the arrow $\vec{C}$ of FIG. 3 so as to extract the pins 322 and 324 from the respective bores 326 and 332 in which they are received. When the operator has carried out this operation, the ball cages 238 and 276 move axially until they occupy the positions represented in FIG. 4. As can be noted in the latter figure, the balls 240 and 278 are wedged between the frusto-conical bearing surfaces 234 and 280 and the outer peripheral surface 215 of the sheath end 214, and are urged into this position by the wedging springs 306 and 308.

A fourth embodiment of an attachment device for attaching to a wall the end of a sheath of a control cable is illustrated in FIG. 5. This fourth embodiment is very close to the one illustrated in FIGS. 3 and 4 and only differs therefrom by some structured details. The components of the device illustrated in FIG. 5 indentical or equivalent to the components of the device illustrated in FIGS. 3 and 4 are designated by the same reference numerals increased by 200.

In this fourth embodiment wherein the attachment device is illustrated in its locked position; in the same way as the device of FIG. 4 is illustrated, the two ball cages 438 and 476 are each provided with wedging springs 506 and 508 which are integrally formed with each of the ball cages 438 and 476, respectively. In this embodiment the ball cages are made from plastic material and the wedging springs are comprised of tabs integrally formed with the plastic ball cages 438 and 476. The tabs 600 and 602 extend from the lateral end faces 440 and 516 of the ball-cages 438 and 476 and bear, through their free ends 601 and 603 on the bearing surfaces 510 and 514 formed on the two end fitting parts 502 and 500, respectively. Such a design of the wedging springs allows a reduction of the number of the components of the attachment device and therefor a decrease of its cost.

Furthermore, the removable abutment means 520 are comprised of the end 604 of a tool such as a screwdriver 606 which can be introduced in a radial bore 608 formed in the separate tubular element 436. When the operator introduces the screwdriver end 604 in the bore 608 in the direction indicated by the arrow $\vec{A}$ and when the thereafter imparts a rotating motion thereto, as indicated by the arrow $\vec{B}$, the end 604 comes into cooperation with the abutment surfaces 528 formed on the ball cages 438 and 436 and then provokes their separation. In the reached position, which is similar to the one illustrated in FIG. 3, the sheath 414 is free to slide in the bore 426 and therefore allows a free adjustment of the length of the sheath. When the operator pulls the screw driver end 604 out from the radial bore 608, the ball cages, under the action of the forces exerted by the wedging tab springs 600 and 602, move back to occupy again their wedging position as illustrated in FIG. 5. In this latter position the sheath 414 is axially fixed with respect to the end fitting 211.

The invention is not limited to the embodiments just illustrated and each of them can in particular be adapted to the two types of cable cited hereinbefore; for example, the apparatus represented in FIG. 2 can be simplified to be fitted on a cable of the pull type only, by omitting the second system 274 of wedging with balls and by axially fixing the position of the separate tubular element 136 on which the frusto-conical bearing surface 134 is formed, with respect to the first terminal part 144.

It should also be noted that in the embodiments represented in FIGS. 1 and 2, use of a terminal in two removable parts 44, 48 and 144, 148, allows the operator who may have installed the cable badly to start the installing operation again. To do this, he simply has to unscrew the screwed terminal part 48 until the balls are unwedged and the sheath end 14 is again free to slide with respect to the terminal 11. In the instance in FIG. 2, the operator has to remove the second terminal part 148 with respect to the first terminal part 144 so that the two parts again occupy the relative position represented in FIG. 2 in which the sheath end 114 is free to slide with respect to the terminal 111.

I claim:

1. A device for attaching to a stationary wall having a wall aperture, an end of a sheath of a mechanical actuating mechanism including a cable axially slidable within said sheath and having one end portion of the cable extending from said sheath end and through said wall aperture, said device comprising:
    a sheath end fitting of substantially cylindrical shape associated with said sheath end, having one end designed to be mounted in said wall aperture and having an inner bore within which is slidably received said sheath end;
    an adjustment spring disposed between said sheath end fitting and said sheath end for urging said sheath end in a direction away from said wall; and
    manually actuable locking means within said sheath end fitting cooperating with said sheath end to prevent axial displacement thereof with respect to said sheath end fitting.

2. The device of claim 1, wherein said locking means comprises at least one wedging system operating between an inner wall portion of said sheath end fitting and the outer peripheral surface of said sheath end, the inner wall portion being axially spaced from said inner bore.

3. The device of claim 2, wherein said wedging system includes a frusto-conical bearing surface at said inner wall portion of said sheath end fitting and a ball cage adjacent said outer peripheral surface of said sheath end and coaxial therewith, said frusto-conical bearing surface and said ball cage being selectively axially movable one relative to the other.

4. The device of claim 3, wherein said wedging system comprises a pair of axially spaced ball cages adapted for cooperating with a pair of frusto-conical bearing surfaces extending in opposite axial directions.

5. The device according to claim 3, characterized in that said end fitting includes a first end fitting part designed to be received in said aperture of the wall and in which said frusto-conical bearing surface is formed, and a second movable end fitting part on which said ball cage is fixed, said second part being capable of being positioned axially with respect to said first part so as to effect axial fixing of said sheath end with respect to said end fitting.

6. The device according to claim 5, characterized in that said second movable end fitting part is mounted screw threadedly in said first end fitting part, said axial displacement of said second movable end fitting part with respect to the first end fitting part being effected by screwing.

7. The device according to claim 5, characterized in that said first and second end fitting parts are telescopic and in that they are provided with relative axial fixing means.

8. The device according to claim 3, characterized in that it includes a wedging spring bearing on said end fitting so as to urge said ball cage resiliently in the axial direction corresponding to wedging, and removable abutment means axially fixing said cage against the force exerted by said wedging spring so as to allow free positioning of said sheath end with respect to the end fitting when the control cable is installed, said removable abutment means being removed after the cable is installed.

9. The device according to claim 8, characterized in that said removable abutment means comprises a pin fitted slidingly in a radial bore of said end fitting and whose end cooperates with an abutment surface formed on said cage.

10. The device according to claim 8, characterized in that said wedging spring is integrally formed on said ball cage.

11. The device according to claim 10, characterized in that said ball cage is made from plastic material, said wedging spring being comprised of at least one tab extending from a lateral end face of said ball cage, the free end thereof bearing against said end fitting.

12. The device according to claim 8, characterized in that said removable abutment means comprises the free end of a tool which can be introduced into a radial bore formed in said end fitting to cooperate with said abutment surface formed on said ball cage.

13. The device according to claim 4, characterized in that the end fitting includes a first end fitting part designed to be received in said aperture of said wall and including a frustoconical bearing surface, and a second movable end fitting part on which a ball cage is fixed, said second part being capable of being positioned axially with respect to said first part so as to effect axial fixing of the sheath end with respect to said end fitting.

14. The device according to claim 4, characterized in that it includes a wedging spring bearing on said end fitting to urge a ball cage resiliently in the axial direction corresponding to wedging, and removable abutment means axially fixing said cage against the force exerted by said wedging spring so as to allow free positioning of said sheath end with respect to the end fitting when the control cable is installed, said removable abutment means being removable after the cable is installed.

15. A sheath end fitting device for attaching an end of a cable sheath to a wall, the sheath containing a cable axially displaceable within said sheath and extending through an aperture in the wall, the device comprising a sheath end fitting disposed about said sheath and cable, the sheath end fitting having an end received in said aperture and an inner through opening slidably receiving said cable, resilient means disposed within said sheath end fitting and interiorily of the sheath to bias the sheath in a direction away from said wall, axially displaceable ball cage means located within the sheath end fitting and having a plurality of balls for engaging said sheath, and inclined biasing means for engaging said plurality of balls whereby displacement of said ball cage means displaces said balls into engagement with said biasing means to bias the balls into engagement with said sheath and axially immobilize said sheath relative to said wall.

16. The device in accordance with claim 15, further comprising resilient means urging said cage means toward said biasing means and tool means inserted through an opening in said sheath end fitting device to position said ball cage means so that said plurality of balls do not engage said biasing means, whereby removal of said tool means allows said balls to engage said biasing means.

17. The device in accordance with claim 15, further comprising resilient means biasing said ball cage means which comprises a pair of ball cages each containing a plurality of balls, each ball cage means being urged toward said biasing means by said resilient means.

18. The device in accordance with claim 15, wherein said ball cage means includes an axially threaded component displaceable in an axial direction relative to said sheath end fitting to effect displacement of said balls.

19. The device in accordance with claim 15, wherein said sheath end fitting device includes a housing telescopically engaging said sheath end fitting and displaceable to effect displacement of said ball cage means to engage said balls with said biasing means and fix axially said sheath relative to the wall.

* * * * *